(12) United States Patent
Cooper (10) Patent No.: US 8,512,829 B2
(45) Date of Patent: *Aug. 20, 2013

(54) METAL-INCLUSIVE EDGE SEAL FOR VACUUM INSULATING GLASS UNIT, AND/OR METHOD OF MAKING THE SAME

(75) Inventor: David J. Cooper, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 896 days.

This patent is subject to a terminal disclaimer.

(21) Appl. No.: 12/000,651

(22) Filed: Dec. 14, 2007

(65) Prior Publication Data

US 2009/0155499 A1    Jun. 18, 2009

(51) Int. Cl.
*E04C 2/54* (2006.01)

(52) U.S. Cl.
USPC .......................... 428/34; 52/786.1; 52/786.13

(58) Field of Classification Search
USPC ...................... 428/34, 212; 52/786.1, 786.13
See application file for complete search history.

(56) References Cited

U.S. PATENT DOCUMENTS

| | | | |
|---|---|---|---|
| 2,122,453 A | | 7/1938 | Clause |
| 4,286,743 A | | 9/1981 | Vasseur et al. |
| 5,009,218 A | | 4/1991 | Bächli |
| 5,290,611 A | * | 3/1994 | Taylor .............................. 428/34 |
| 5,458,943 A | * | 10/1995 | Taylor .............................. 428/34 |
| 5,657,607 A | | 8/1997 | Collins et al. |
| 5,664,395 A | | 9/1997 | Collins et al. |
| 5,902,652 A | | 5/1999 | Collins et al. |
| 6,192,652 B1 | * | 2/2001 | Goer et al. .................. 52/786.13 |
| 6,365,242 B1 | | 4/2002 | Veerasamy |
| 6,383,580 B1 | | 5/2002 | Aggas |
| 6,399,169 B1 | | 6/2002 | Wang et al. |
| 6,444,281 B1 | | 9/2002 | Wang et al. |
| 6,503,583 B2 | | 1/2003 | Nalepka et al. |
| 6,541,083 B1 | | 4/2003 | Landa et al. |
| 6,635,321 B2 | | 10/2003 | Wang et al. |

(Continued)

FOREIGN PATENT DOCUMENTS

| | | |
|---|---|---|
| DE | 42 32 395 | 3/1994 |
| EP | 0 061 183 | 9/1982 |

(Continued)

OTHER PUBLICATIONS

International Search Report dated Apr. 3, 2009.

*Primary Examiner* — Donald J Loney
(74) *Attorney, Agent, or Firm* — Nixon & Vanderhye P.C.

(57) ABSTRACT

Certain example embodiments of this invention relate to metal-inclusive edge seal designs for vacuum insulating glass (VIG) units, and/or methods of making the same. First and second substantially parallel spaced-apart glass substrates, including edge portions thereof, are provided. At least one metal-inclusive edge-sealing strip is located proximate to the edge portions of the first and second substrates, getter being applied to at least a portion of at least some of the edge-sealing strips, and the at least one edge-sealing strip being selected so as to have a coefficient of thermal expansion over a temperature range of interest within about 25% of a coefficient of thermal expansion of the first and second substrates, the temperature range of interest being from about −40° C. to about 50° C. The first and second substrates are sealed together proximate to the edge portions thereof with the at least one edge-sealing strip via an edge-sealing material provided to the at least one edge-sealing strip and/or the first and second glass substrates.

5 Claims, 8 Drawing Sheets

(56) References Cited

U.S. PATENT DOCUMENTS

| | | |
|---|---|---|
| 6,641,689 B1 | 11/2003 | Aggas |
| 6,692,600 B2 | 2/2004 | Veerasamy et al. |
| 6,701,749 B2 | 3/2004 | Wang et al. |
| 6,946,171 B1 | 9/2005 | Aggas |
| 7,244,480 B2 | 7/2007 | Minaai et al. |
| 2002/0035852 A1 | 3/2002 | Wang et al. |
| 2008/0166570 A1 | 7/2008 | Cooper |

FOREIGN PATENT DOCUMENTS

| | | |
|---|---|---|
| EP | 0 403 058 | 12/1990 |
| EP | 0 421 239 | 4/1991 |
| EP | 0 585 534 | 3/1994 |
| EP | 1 978 199 | 10/2008 |
| GB | 751 807 | 7/1956 |
| GB | 1 485 151 | 9/1977 |
| GB | 2 261 247 | 5/1993 |
| WO | WO 2006/013088 | 2/2006 |

* cited by examiner

METAL-INCLUSIVE EDGE SEAL FOR VACUUM INSULATING GLASS UNIT, AND/OR METHOD OF MAKING THE SAME

FIELD OF THE INVENTION

Certain example embodiments of this invention relate to edge seals for vacuum insulating glass (VIG) units, and/or methods of making the same. More particularly, certain example embodiments relate to metal-inclusive edge seal designs for VIG units, and/or methods of making the same. In certain example embodiments, at least one metal-inclusive edge-sealing strip is provided for sealing the edge portions to be sealed, the at least one edge-sealing strip being selected so as to have a coefficient of thermal expansion over a temperature range of interest within about 25% of a coefficient of thermal expansion of the first and second substrates, the temperature range of interest being from about −40° C. to about 50° C.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

Figure 1:
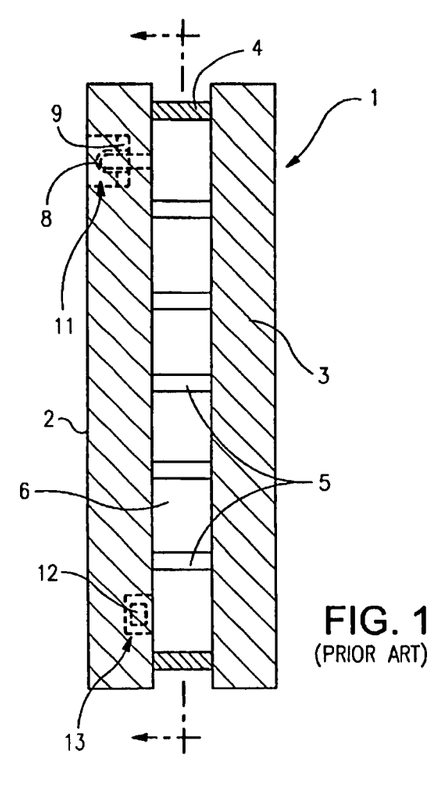
FIG. 1 is a prior art cross-sectional view of a conventional vacuum IG unit.
Figure 2:
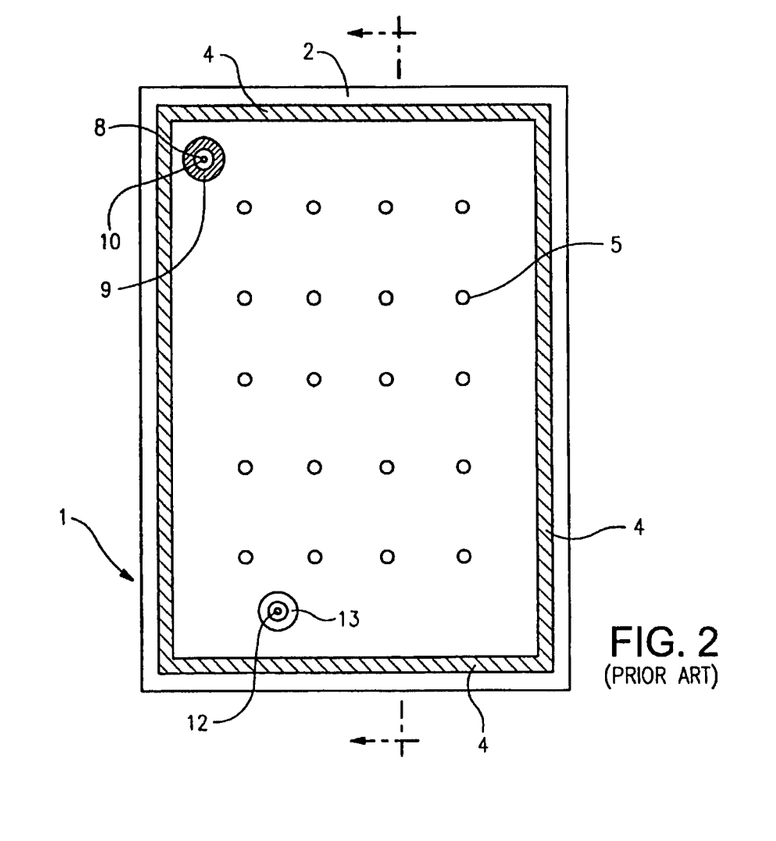
FIG. 2 is a prior art top plan view of the bottom substrate, edge seal, and spacers of the FIG. 1 vacuum IG unit taken along the section line illustrated in FIG. 1.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventor Collins of the '395 patent states in "Thermal Outgassing of Vacuum Glazing," by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Figure 3:
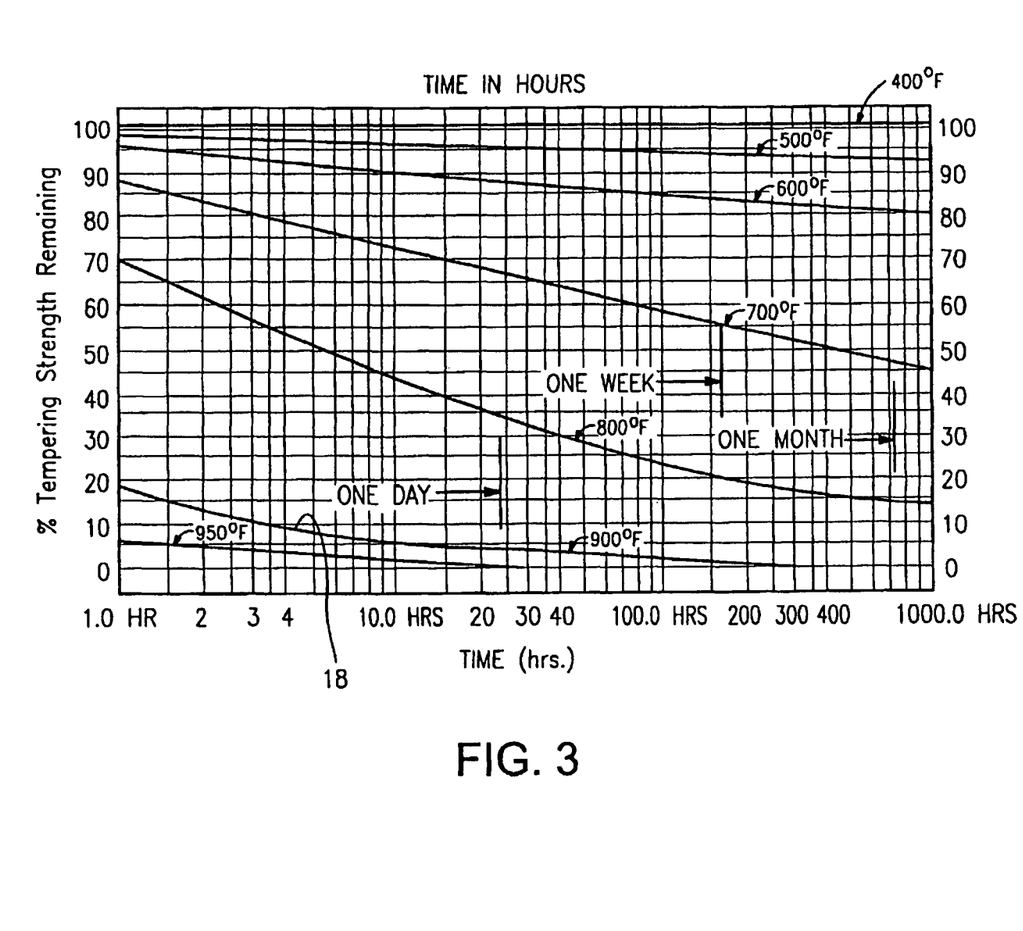
FIG. 3 is a graph correlating time (hours) versus percent tempering strength remaining, illustrating the loss of original temper strength for a thermally tempered sheet of glass after exposure to different temperatures for different periods of time.
Figure 4:
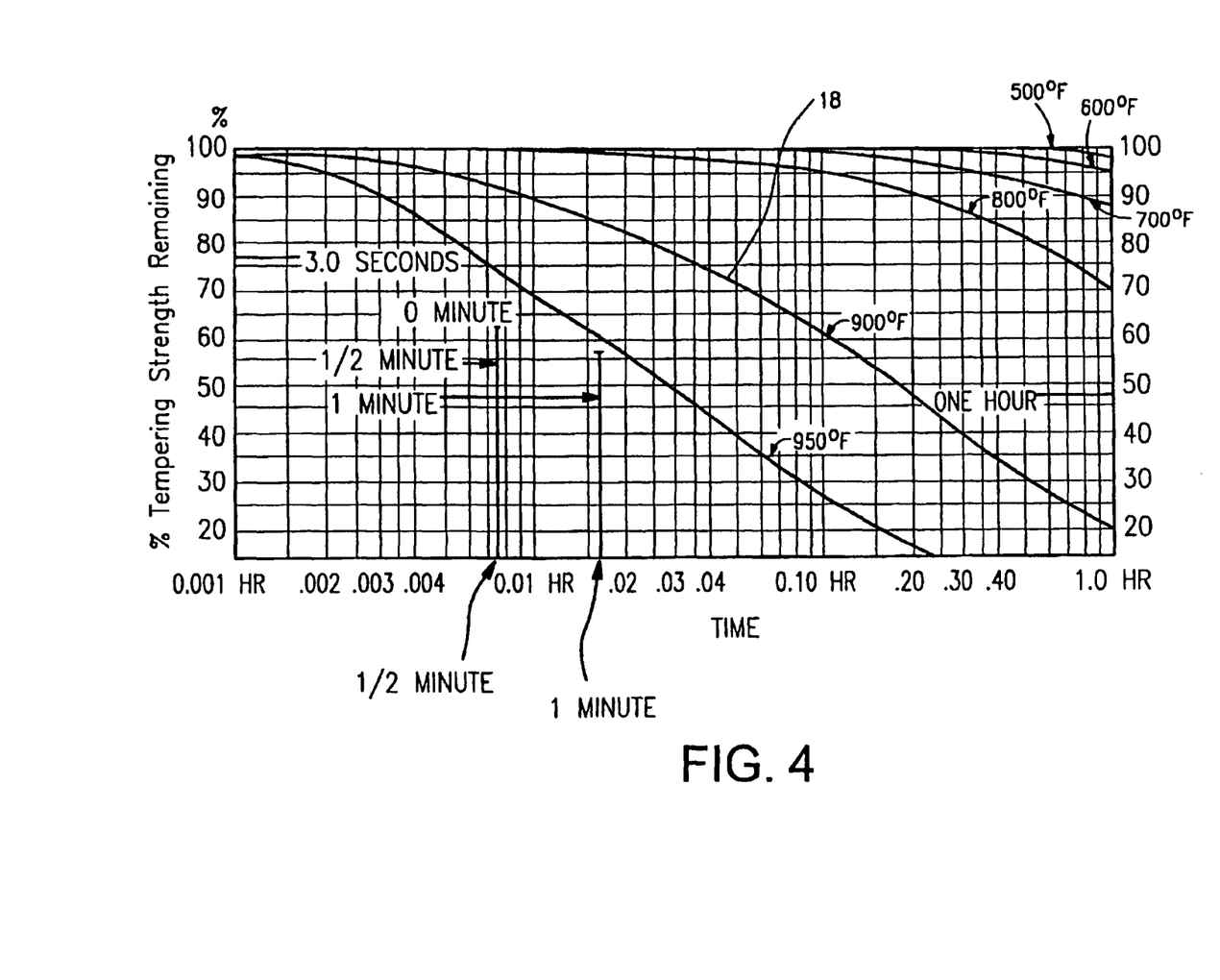
FIG. 4 is a graph correlating time versus percent tempering strength remaining similar to that of FIG. 3, except that a smaller time period is provided on the x-axis.

Unfortunately, the aforesaid high temperatures and long heating times of the entire assembly utilized in the formulation of edge seal 4 are undesirable, especially when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered sheet when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

Even when non-tempered glass substrates are used, the high temperatures applied to the entire VIG assembly may melt the glass or introduce stresses. These stresses may increase the likelihood of deformation of the glass and/or breakage.

Moreover, the ceramic or solder glass edge seals of conventional VIG units tend to be brittle and prone to cracking and/or breakage, reducing the ability of individual glass panels to move relative to one another. Glass panel movement is known to occur under normal conditions such as, for example, when two hermetically sealed glass components (such as in a VIG unit) are installed as a component of a window, skylight or door, whereby the VIG unit is exposed to direct sunlight and one glass panel has higher thermal absorption than the other panel or there is a great difference between the interior and exterior temperatures.

Thus, it will be appreciated that there is a need in the art for a vacuum IG unit, and corresponding method of making the same, where a structurally sound hermetic edge seal may be provided between opposing glass sheets. There also exists a need in the art for a vacuum IG unit including tempered glass sheets, wherein the peripheral seal is formed such that the glass sheets retain more of their original temper strength than with a conventional vacuum IG manufacturing technique where the entire unit is heated in order to form a solder glass edge seal.

In certain example embodiments of this invention, there is provided a method of making a vacuum insulating glass (VIG) unit, including an edge seal thereof. A unit comprising first and second substantially parallel spaced-apart glass substrates, and one or more edge portions of the first and second substrates to be sealed, is provided. At least one metal-inclusive edge-sealing strip is provided for sealing the edge portions to be sealed, the at least one edge-sealing strip being selected so as to have a coefficient of thermal expansion over a temperature range of interest within about 25% of a coefficient of thermal expansion of the first and second substrates, the temperature range of interest being from about −40° C. to about 50° C. Getter is applied to at least a portion of at least one said edge-sealing strip. Each said edge portion of the first and second substrates to be sealed is sealed together with an edge-sealing strip, in making the vacuum insulating glass unit, via an edge-sealing material provided to the edge-sealing strip and/or the first and second glass substrates.

In certain example embodiments, a vacuum insulating glass (VIG) unit, including an edge seal thereof, is provided. First and second substantially parallel spaced-apart glass substrates, including edge portions thereof, are provided. At least one metal-inclusive edge-sealing strip is located proximate to the edge portions of the first and second substrates, getter being applied to at least a portion of at least some of the edge-sealing strips, and the at least one edge-sealing strip being selected so as to have a coefficient of thermal expansion over a temperature range of interest within about 25% of a coefficient of thermal expansion of the first and second substrates, the temperature range of interest being from about −40° C. to about 50° C. The first and second substrates are sealed together proximate to the edge portions thereof with the at least one edge-sealing strip via an edge-sealing material provided to the at least one edge-sealing strip and/or the first and second glass substrates.

In certain example implementations, in sealing each said edge portion of the first and second substrates to be sealed with an edge-sealing strip, edge-sealing material is applied to the first and/or second substrates proximate to the edge portions thereof to be sealed, and/or to the at least one edge-sealing strip at one or more glass-to-edge-sealing surfaces thereof; and the at least one edge-sealing strip is bonded to the first substrate by heating and cooling, in this order, the first and second substrates, the at least one edge-sealing strip, and the edge-sealing material, the edge-sealing material being at least partially melted during the heating.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates. Also, while a component may be said to be "on" or "supported" by one or more of the substrates herein, this does not mean that the component must directly contact the substrate(s). In other words, the word "on" covers both directly and indirectly on, so that the component may be considered "on" a substrate even if other material (e.g., a coating and/or thin film) is provided between the substrate and the component.

In certain example embodiments of this invention, there is provided a metal edge sealing strip is employed as an edge seal element. The metal edge sealing strip allows for reduced stress associated with thermal expansion and contraction. This is related, in part, to the ductile nature of the metal chosen.

The metal strip may be constructed of a metal with a low coefficient of thermal expansion which, in certain example embodiments, may be close to the same as soda lime glass over the temperature range of concern, which typically extends from about −40° C. to about 50° C. The "metal strip" may be made of one metal or a plurality of metals (metal alloy), and may include small amounts of non-metals such as oxygen or the like, and also may coated with a non-metal. The coefficient of thermal expansion is a thermodynamic property of a substance that relates the change in temperature to the change in a material's dimensions. The coefficient of thermal expansion for soda lime glass is about $8.5\times10^{-6}$/K at room temperature. Preferably, the coefficient of thermal expansion for the metal chosen will deviate from the coefficient of thermal expansion for the glass over the temperature range of concern less than about 30%, more preferably less than about 25%, more preferably less than about 20%, and still more preferably less than about 15%. For example, certain example embodiments may include metals and metal alloys such as: MA-INV36, MA-S-INVER, MA-F15KV, MA902, MA-B2, Mo SUS304 commercially available from Mitsubishi materials; Alloy 17-4PH commercially available from Sandmeyer Steel Company; Dilaton 28/21, Dilaton 29/18, Dilaton 36, Dilaton 41, Dilaton 42, Dilaton 42LC, Dilaton 46, Dilaton 47, Dilaton 48, Dilaton 48Cr6, Dilaton 48Cr6Al, Dilaton 51, Dilaton 51Cr1, Dilaton 55 commercially available from Deutsche Nickel America, Inc.; and/or MIM Kovar (Fe 28Ni 18Co) commercially available from SSI Technologies, Inc. 100361 In certain example embodiments, the metal itself may be resistant to atmospheric oxidation as it may be exposed to atmospheric conditions. Additionally, or in the alternative, a metallic and/or other coating may be applied to at least a portion of the strip (e.g., the entire strip, the outwardly exposed portions of the strip, etc.) to reduce the impact of atmospheric oxidation. Such an oxidation reducing coating may be of any suitable metal, or alternatively may be of silicon nitride or the like in example embodiments.

The metal strip final thickness dimension may be chosen so that it is approximately equal to that of the VIG pillar height, less the total height of any frit or solder glass, bonding metal, or any other coatings applied to the outer edges of the metal strip. The metal strip width preferably is between about 5-30 mm and more preferably between about 10-25 mm.

Figure 5A:
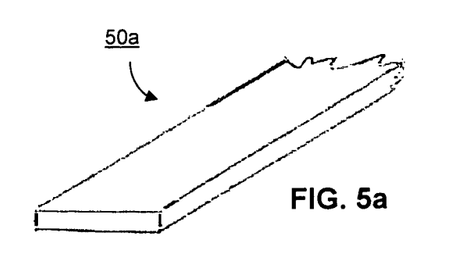
FIG. 5a is a partial perspective view of a substantially rectangular prism shaped metal strip in accordance with an example embodiment.
Figure 5B:
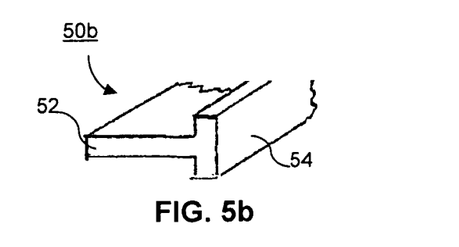
FIG. 5b is a partial perspective view of a substantially T-shaped metal strip in accordance with an example embodiment.

FIGS. 5a-e show a variety of different metal strip configurations. FIG. 5a is a partial perspective view of a substantially rectangular prism shaped metal strip 50a in accordance with an example embodiment. FIG. 5b is a partial perspective view of a substantially T-shaped metal strip 50b in accordance with an example embodiment. The insertion of the metal strip 50a into the VIG assembly is described in greater detail below.

The substantially T-shaped metal strip 50b includes two substantially perpendicular members 52, 54. The first member 52 may be inserted between the glass substrates proximate at or proximate to the edges thereof, and the second member may help hold the metal strip 50b in place as the VIG assembly is pumped-down, which sometimes may pull the metal strip towards the pump-out area. Also, the second member 54 may be adjacent to the edges of the first and second substrates. In certain example implementations, the metal strip 50b may be extruded in this substantially T-shape. The insertion of the metal strip 50b into the VIG assembly is described in greater detail below.

Figure 5C:
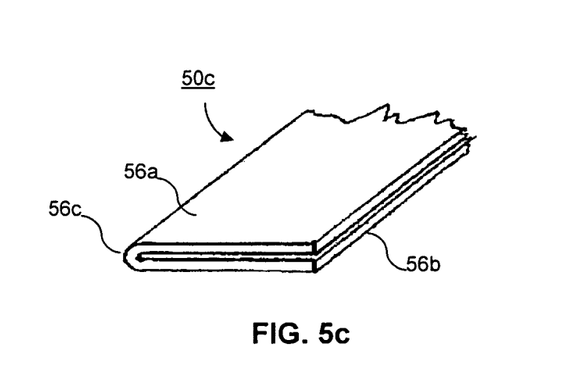
FIG. 5c is a partial perspective view of a folded-over substantially U-shaped metal strip in accordance with an example embodiment.

FIG. 5c is a partial perspective view of a folded-over substantially U-shaped metal strip 50c in accordance with an example embodiment. The metal strip 50c uses a thinner metal such that it is at the desired thickness when folded. The metal strip 50c is folded about a fold 56c to define upper and lower legs 56a, 56b. Thus, the upper and lower legs 56a, 56b, and any space left therebetween, may bring the folded metal strip 50c to a desired thickness.

Figure 5D:
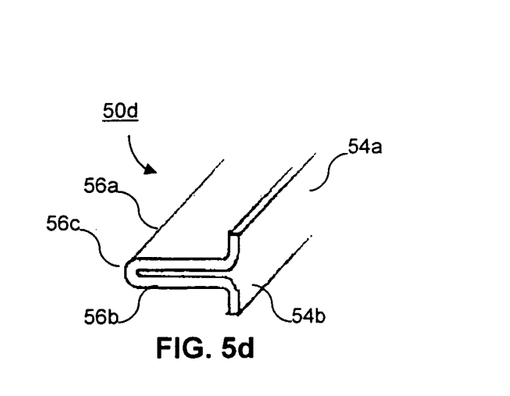
FIG. 5d is a partial perspective view of a folded-over substantially T-shaped metal strip in accordance with an example embodiment.

FIG. 5d is a partial perspective view of a folded-over substantially T-shaped metal strip 50d in accordance with an example embodiment. Similar to the arrangement shown in FIG. 5b, the metal strip 50d may include two substantially perpendicular members defined by 56a/56b/56c and 54a and 54b. That is, a first member to be inserted between the first and second substrates may be similar to the metal strip 50c in that the metal strip 50d may be folded about a fold 56c to define upper and lower legs 56a, 56b. Rather than a single continuous second member, opposingly bent arms 54a, 54b help define this second "member" that is substantially perpendicular to the first member.

Figure 5E:
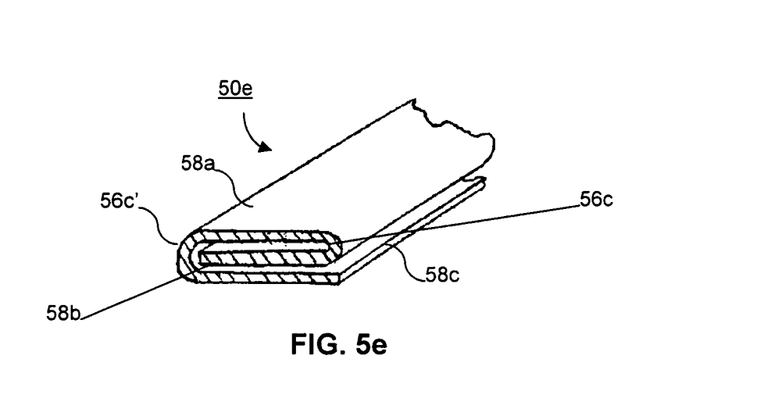
FIG. 5e is a partial perspective view of an example a metal strip including multiple folds in accordance with an example embodiment.

FIG. 5e is a partial perspective view of an example a metal strip 50e including multiple folds in accordance with an example embodiment. There are two folds 56c, 56c' in the FIG. 5e example embodiment, although more or fewer folds may be implemented to help bring the thinner metal to the desired thickness by forming a spiral-like metal strip 50e. Thus, in the FIG. 5e example, the metal is bent about a first fold 56c to form a first and second surfaces 58a and 58b. The already folded metal is folded again about fold 56c' so as to form a third surface 58c. The first, second, and third surfaces are substantially parallel to one another. It will be appreciated that other metal strip shapes may be used in connection with certain example embodiments. For example, the same and/or differently shaped or bent metal strips may be used where a VIG assembly comprises two substrates that do not extend to even lengths (e.g., unlike the arrangement shown in FIG. 6a, for example).

The folded arrangement of certain example metal strips may be advantageous in certain example instances. For example, such folds allow some spring or "give-and-take" within the assembly and/or assembled unit. Conventional glass frits or solders tend to become brittle during and/or after heating, but the incorporation of metal strips, including those with one or more folds, may help reduce this problem of conventional edge sealants.

Figure 6A:
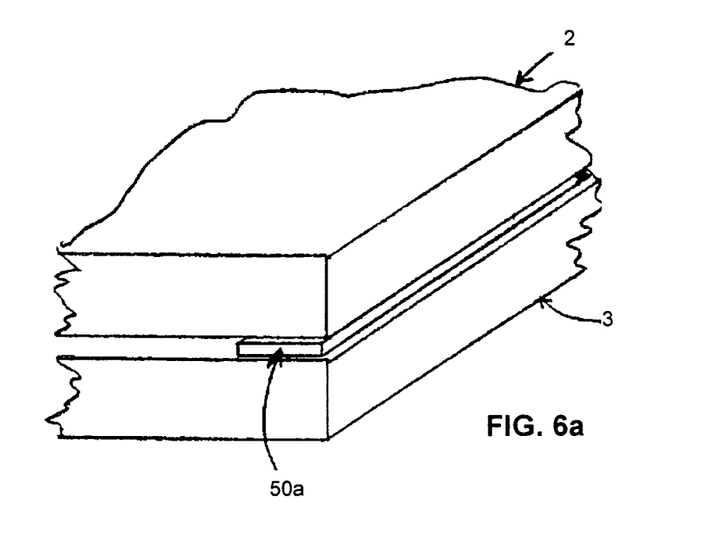
FIG. 6a is a view of the metal strip of FIG. 5a inserted between two substrates proximate to the edges thereof in accordance with an example embodiment.
Figure 6B:
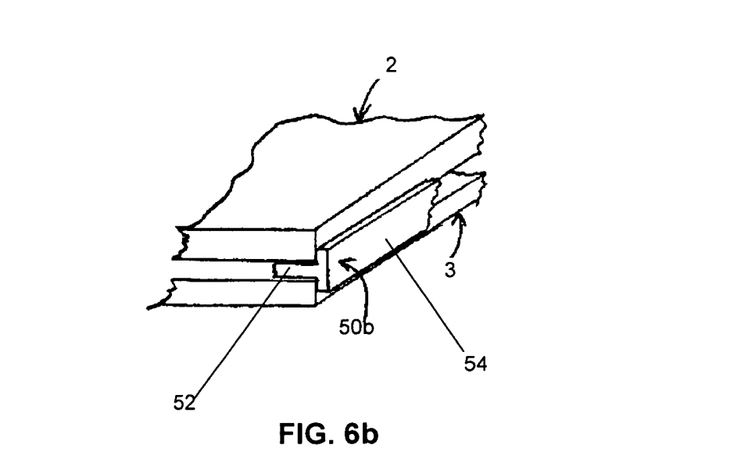
FIG. 6b is a view of the metal strip of FIG. 5b inserted between two substrates proximate to the edges thereof in accordance with an example embodiment.

FIG. 6a is a view of the metal strip 50a of FIG. 5a inserted between two substrates 2, 3 proximate to the edges thereof in accordance with an example embodiment. FIG. 6b is a view of the metal strip 50b of FIG. 5b inserted between two substrates 2, 3 proximate to the edges thereof in accordance with an example embodiment.

Getter may optionally be included in certain example embodiments. A metal strip optionally may be coated on one or more surfaces thereof with a getter (e.g., a flashed getter or heat activated getter material that is activated by the heating process that also seals the VIG unit). Getters are reactive materials used for removing traces of gas from vacuum systems. Getters may be advantageously used in connection with certain example embodiments, as they reduce the effects of radicals trapped within the panel and/or outgassing, which may compromise the insulation value of the assembled VIG unit. Getters commercially available from SAES may be used in connection with certain example embodiments. The getter material may be provided to the interior cavity or vacuum gap of the VIG assembly. The getter material may include, for example, barium, aluminum, magnesium, calcium, sodium, strontium, cesium, and/or phosphorus.

Figure 7:
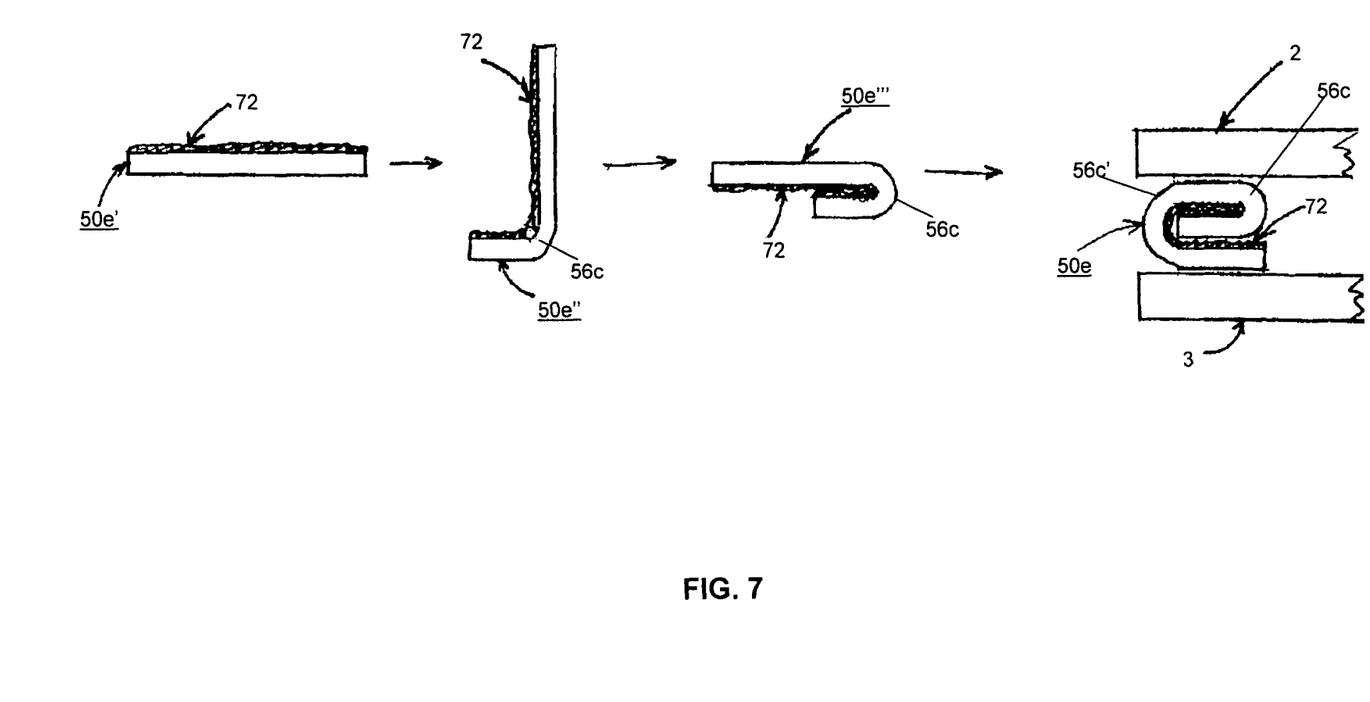
FIG. 7 is a view of the assembly of the metal strip of FIG. 5e in accordance with an example embodiment.

FIG. 7 is a view of the assembly of the metal strip 50e of FIG. 5e in accordance with an example embodiment. A metal strip 50e' is provided and getter 72 is applied thereto. The metal strip 50e' is folded about a first fold 50c into a J-shaped article 50e" and then into a hook-shaped article 50e'". The hook-shaped article 50e'" is folded about a second fold 56c' to form the metal strip 50e, which is inserted between the substrates 2, 3 proximate to the edges thereof. Even though the metal strip 50e is the same width and height of other metal strips, it will be appreciated that the roll-formation process increases the available surface area for the getter, potentially allowing for more getter to be applied thereto.

Several techniques may be used to seal the metal to the glass. In a first example implementation of sealing the metal to the glass, the metal strip is coated on both glass-to-metal sealing surfaces with a ceramic frit slurry or glass solder paste (e.g., ink). The metal strip is continuously or batch-wise passed through an oven, where the metal and frit reach the melting point of the frit, then allowed to cool back down to room temperature where the frit or solder glass is a solid coating on the metal surfaces that will be in contact with the glass panels of the VIG unit. The glass panels are similarly prepared with a frit or glass solder perimeter that has been pre-fired. The coated strip is cut to length and arranged around the perimeter of the bottom glass panel. Extra frit or solder glass material is dispensed at the perimeter corners to seal the gaps between the metal strips. The bottom or top glass panel is heated to the frit melting point for a given period of time and then allowed to slowly cool, whereby the metal is bonded to the glass. After other VIG assembly related operations take place (e.g., such as, for example, pillar placement), the top glass panel is placed over the bottom glass panel. The entire assembly (at least in terms of around the entire edges thereof) is heated up to the frit or solder paste melting point, and a vacuum is applied to the cavity, whereby the unit is sealed and allowed to cool.

In a variation on this example implementation of sealing the metal to the glass, localized heating (using, for example, inductive, focused infrared (IR), microwave, laser, or other heat sources) may be applied proximate to the edges of the assembly (but not the assembly in its entirely), allowing the edge of the glass and frit or solder glass components to reach the melting point, but not the body of the glass panels. In this way tempered or heat strengthened glass panels may not lose their strength through de-tempering, or will de-temper to a temper strength of less than about 50% of original temper strength.

In a second example implementation of sealing the metal to the glass, ceramic frit or solder glass paste is applied either to the edges or perimeter areas of the glass panels, to both glass-to-metal sealing surfaces of the metal strip, and/or to area along the outside of the assembly, along the outer edges of the metal strip and/or glass substrates. In such a case, the frit or solder glass is not pre-fired. The metal strip may be held in place during the vacuum process, e.g., by the legs of the T-shaped metal strip. Heating is applied as described above. For example, the metal strip and one substrate may be heated and cooled and then the entire assembly may be heated and cooled, or the entire assembly may be heated and cooled at one time. Additionally, localized heating optionally may be applied, as in the variation above.

In a third example implementation of sealing the metal to the glass, the surfaces to be bonded are pre-coated with a thin layer of indium or other metal glass solder (e.g., via sputtering, chemical vapor deposition (CVD), or by other means). Heating, bonding and cooling is carried out as described in the first example implementation of sealing the metal to the glass described above. The selection of the material to be coated may be chosen based at least partially on its ability to bond with glass. For example, indium is a good bonder with glass at low temperatures. As above, the metal strip and one substrate may be heated and cooled and then the entire assembly may be heated and cooled, or the entire assembly may be heated and cooled at one time. Additionally, localized heating optionally may be applied.

Figure 8:
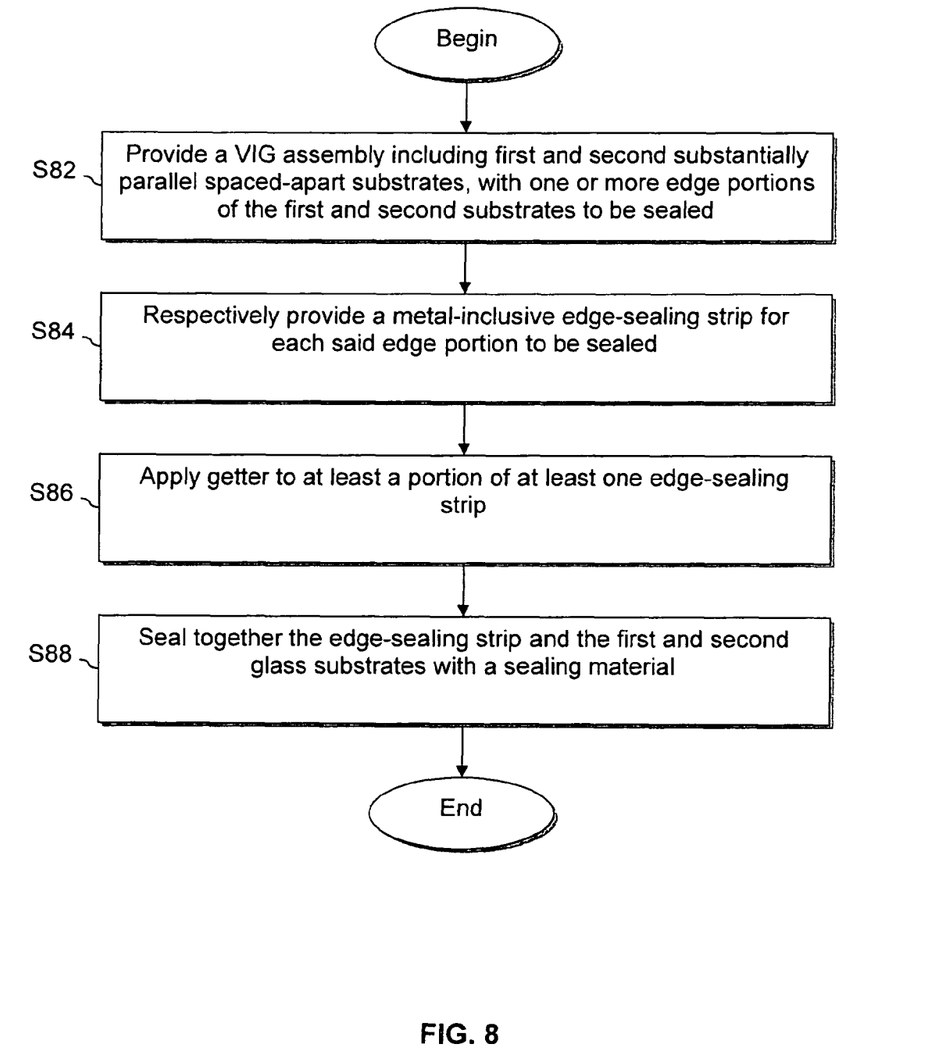
FIG. 8 is an illustrative flowchart showing a process for sealing together a metal sealing strip and two glass substrates, in accordance with an example embodiment.

FIG. 8 is an illustrative flowchart showing a process for sealing together a metal sealing strip and two glass substrates, in accordance with an example embodiment. In step S82, a VIG assembly including first and second substantially parallel spaced-apart substrates, with one or more edge portions thereof to be sealed is provided. In step S84, a metal-inclusive edge-sealing strip for each said edge portion to be sealed is respectively provided. Getter is applied to at least a portion of at least one edge-sealing strip in step S86. The edge-sealing strip and the glass substrates are sealed together with a sealing material (which may comprise, for example, a ceramic frit slurry, solder paste, and/or the like) in step S88. This step of sealing together the edge-sealing strip and the glass substrates may further comprise one or more of the techniques described above.

Figure 9:
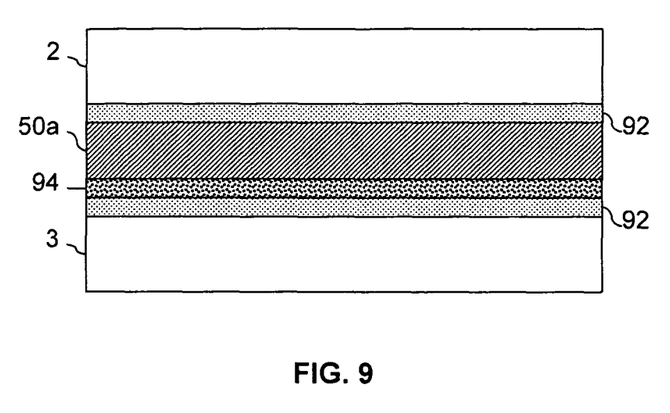
FIG. 9 is an end view of the unit of FIG. 6a showing the first and second substrates, an edge-sealing strip, and edge-sealing material, in accordance with an example embodiment.

It will be appreciated that other techniques may be used to seal the metal to the glass in addition to, or apart from, those listed above. Also, as alluded to above, the particular metal strip sealing techniques described above may be used alone or in various combinations in certain example embodiments. For example, in certain example implementations, in sealing each said edge portion of the first and second substrates to be sealed with an edge-sealing strip, edge-sealing material is applied to the first and/or second substrates proximate to the edge portions thereof to be sealed, and/or to the at least one edge-sealing strip at one or more glass-to-edge-sealing surfaces thereof; and the at least one edge-sealing strip is bonded to the first substrate by heating and cooling, in this order, the first and second substrates, the at least one edge-sealing strip, and the edge-sealing material, the edge-sealing material being at least partially melted during the heating. For example, FIG. 9 is an end view of the unit of FIG. 6a showing the first and second substrates 2, 3, an edge-sealing strip 50a, and edge-sealing material 92, in accordance with an example embodiment. Getter 94 is applied to the edge-sealing strip 50a. An edge-sealing material 92 is shown on interior surfaces of the glass substrates 2, 3. As noted above, the edge-sealing material 92 may be applied, directly or indirectly, to one or both of the glass substrates 2, 3 and/or to one or both strip-to-glass sealing surfaces of the edge-sealing strip 50a.

It will be appreciated that any number of metal-inclusive edge-sealing strips described herein may be used in connection with certain example embodiments. For example, in certain example embodiments, an edge-sealing strip may be provided for each edge to be sealed, a single strip (e.g., a substantially rectangular strip) may be provided for sealing all edges of the VIG assembly, multiple strips may be provided for a single side, etc.

Also, it will be appreciated that the example embodiments described herein may be used in connection with a variety of different VIG assembly and/or other units or components. For example, the substrates may be glass substrates, heat strengthened substrates, tempered substrates, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum insulating glass (VIG) unit comprising:
first and second substantially parallel spaced-apart glass substrates, including edge portions thereof;
at least one metal strip located between the substrates and proximate to the edge portions of the substrates,
the at least one metal strip having a coefficient of thermal expansion so that the coefficient of thermal expansion of the at least one metal strip and a coefficient of thermal expansion of the glass substrates do not differ from each other by more than about 25% over a temperature range of from about −40° C. to about 50° C.;
wherein the first and second substrates are sealed together proximate to the edge portions thereof via the at least one metal strip and an edge-sealing material provided proximate the at least one metal strip and the first and second glass substrates; and
wherein the at least one metal strip is spiral shaped so as to include multiple folds and at least three substantially coplanar portions at different planes between the glass substrates, and wherein the at least one metal strip is provided between only the first and second substrates and not between any other glass substrate(s).

2. The vacuum insulating glass unit of claim 1, further comprising getter material provided on at least a portion of the strip.

3. The vacuum insulating glass unit of claim 1, wherein the coefficient of thermal expansion of the strip and a coefficient of thermal expansion of the glass substrates do not differ from each other by more than about 15% over a temperature range of from about −40° C to about 50° C.

4. The vacuum insulating glass unit of claim 1, wherein the strip has a width of from about 10-25 mm.

5. The vacuum insulating glass unit of claim 1, further comprising getter material provided on each of the at least three substantially coplanar portions of the strip.

* * * * *